May 11, 1965     E. G. MARKOW     3,182,705
RESILIENT WHEEL

Filed Aug. 29, 1963     2 Sheets-Sheet 1

INVENTOR.
EDWARD G. MARKOW

ATTORNEY

May 11, 1965  E. G. MARKOW  3,182,705
RESILIENT WHEEL

Filed Aug. 29, 1963

FOOTPRINT

INVENTOR.
EDWARD G. MARKOW
BY
ATTORNEY

3,182,705
RESILIENT WHEEL
Edward G. Markow, Oakdale, N.Y., assignor to Grumman Aircraft Engineering Corporation, Bethpage, Long Island, N.Y., a corporation of New York
Filed Aug. 29, 1963, Ser. No. 305,409
7 Claims. (Cl. 152—12)

This invention relates to improvements in elastic wheels and more particularly, to that class known as spring or resilient wheels.

As referred to herein, resilient wheels are understood to comprise those wheels having a central hub and an elastic rim, the rim being connected to the hub by means of arcuate elastic spokes. The application of a vertical load and/or a driving torque to the wheel produces a deflection of the spokes and the rim which causes the wheel to assume an elliptical shape and results in an increase in the area of the rim contacting the supporting surface. This contact area is termed the wheel footprint and is the length of the rim in contact with the surface multiplied by the width of the rim.

Although resilient wheels have utility for use with vehicles in substantially any application, the advantages of such wheels are most pronounced for cross-country or off-the-road service. The performance of an off-the-road vehicle is normally limited more by soil failure under the vehicle than by a power deficiency of the vehicle. In the vehicle-to-soil relationship, studies have shown that the two most important mobility parameters are soil strength and rolling resistance.

If the strength of the soil is barely sufficient to overcome the rolling resistance, a vehicle moving at a constant speed on a given soil will not be able to accelerate or negotiate rising ground. Studies indicate wheel diameter to be the most sensitive parameter affecting rolling resistance in most soil types. As the wheel diameter governs the size of its footprint and as rolling resistance has been found to be inversely proportional to the length of the vehicle footprint, this has led to the use of large diameter wheels as well as tracks on conventional off-the-road vehicles.

In operation, the resilient wheel of my invention approaches the elongated footprint characteristics or ground contact advantage of a tracked vehicle while retaining the weight and mechanical friction advantage inherent in a simple central hub design. Because the footprint enlarges with increases in load, there is substantially no rise in overall footprint unit pressures on the surface with increased loads. Thus, the wheel of my invention offers the load-carrying ability of the tracked vehicle and yet exhibits the dynamic stability of a rigid wheel to produce improved mobility in poor soil with minimum energy losses.

I have found in off-the-road locomotion that the ability of the wheel of my invention to increase its footprint improves its mobility by lowering both its rolling resistance and its slip rate. Reductions in rolling resistance of from 30 to 75 percent have been achieved depending on the spring constant of the wheel design. Higher thrusts or drawbar pulls have been attained at lower slip rates than with conventional rigid wheels of corresponding free diameter. In addition, a significant increase in obstacle climbing performance has been shown by my invention.

I have also found that when my invention is provided with spaced links on the outer periphery of the rim, there is a significant gain in net traction in spite of an increase also in the rolling resistance. Gross traction developed by my wheel equipped with spaced links was about 60 percent greater on a loose soil surface than a rigid wheel which was also equipped with spaced links. With a more cohesive surface, the gain in gross traction should be even more significant.

The improved performance attainable with my invention was further emphasized by tests made of the thrust or drawbar pull of my wheel as contrasted with the slip rate. Slip rate is defined as the amount a wheel slips in its soil shearing process in developing useful thrust. For smooth-rimmed wheels developing traction by soil grip failure, my invention reaches maximum traction at a 50 percent lower slip rate than a rigid wheel. For spaced-link wheels, which develop traction by ground failure, both wheels reach maximum traction between 10 and 15 percent slip.

My invention exhibited a near constant slip rate throughout a greater part of its drawbar range while the rigid wheel had a characteristic increase in slip rate with increasing drawbar pull. It is believed that the reason for the constant slip behavior of the wheel of my invention is the proportional increase in ground contact area that results with increases in torque. This behavior may also be attributable to the fact that the low unsprung mass of my wheel keeps its rim in intimate contact with the surface during a greater percentage of the running time.

Accordingly, it is the principal object of my invention to provide an improved resilient wheel which forms a totally elastic system in which the wheel structure itself supports all applied loads and driving torques and which, under those loads and torques, assumes a substantially elliptical shape that enlarges the wheel contact surface for increased mobility over a wide range of terrain and soil conditions.

It is a further object of my invention to provide an improved resilient wheel having a relatively small unloaded diameter but having the operating characteristics of a wheel of much larger diameter so as to have the ground contact advantage of a tracked system without the weight and complexity of such a system, and which retains the unsprung weight and mechanical friction advantages inherent in a simple central hub wheel design.

It is yet another object of my invention to provide an improved resilient wheel that offers the load-carrying ability and dynamic stability of a rigid wheel several times its size and which also achieves improved mobility in rough terrain and poor soil with minimum energy loss.

Still another object is the provision of a resilient wheel having improved poor soil mobility because of its characteristics of decreased roll resistance, increased drawbar pull, low slip rate, and favorable obstacle climbing ability.

Yet another object is the provision of a resilient wheel of high structural efficiency whose design offers minimum energy loss within the wheel due to friction, flexure, or hysteresis, and which operates at low stress levels such that a wide selection of materials become feasible for its construction. Thus, the design permits an all-metal construction which is light in weight and efficient and yet is substantially invulnerable to damage when operating over unfavorable terrain and when subjected to environmental extremes.

A further object of this invention is the provision of an improved resilient wheel whose design permits the incorporation of spaced links for enhanced mobility and whose efficiency with such links increases proportionally with applied torques and loads as a function of the increased soil volume influenced by the greater number of cleats engaging the soil with the elongation of the wheel footprint in response to those torques and loads.

Other objects and advantages will become apparent from the following description when taken in conjunction with the accompanying drawings in which.

Figure 1:
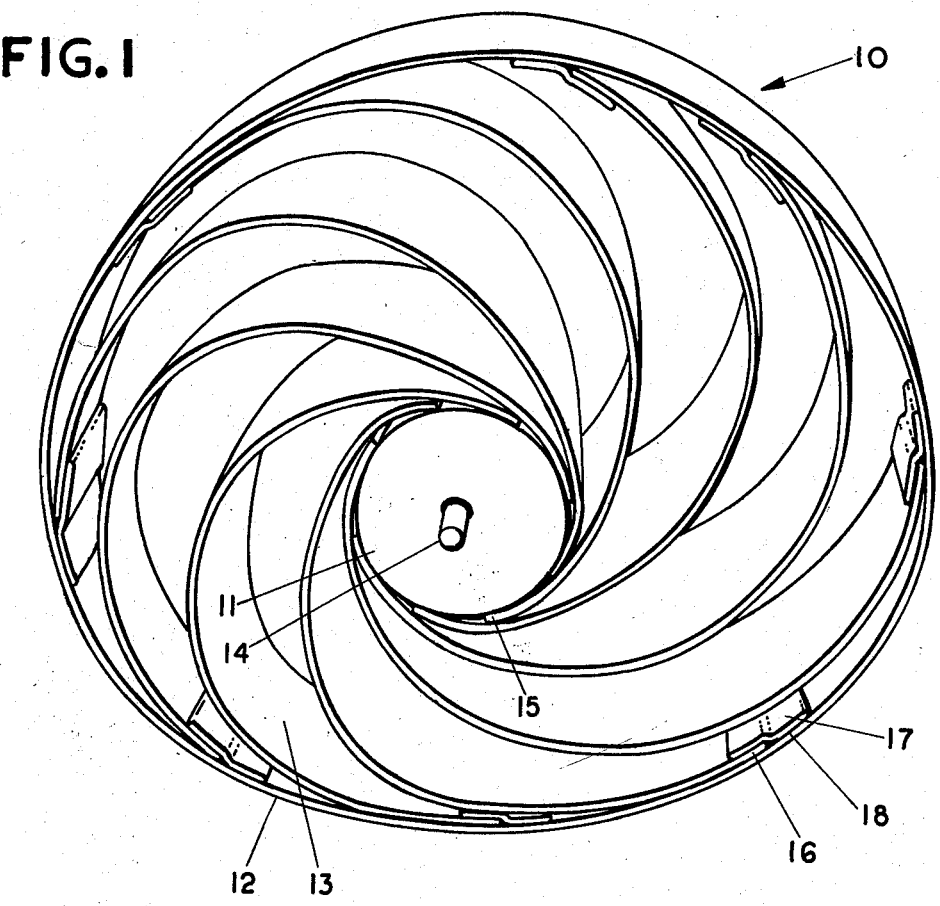
FIG. 1 is a perspective view of a resilient wheel embodying the present invention.

Referring to FIG. 1, the resilient wheel 10 comprises a hub 11, an elastic rim 12, and arcuate elastic spokes 13 connecting the rim to the hub. Wheel 10 is mounted on a vehicle (not shown) which it supports by means of axle 14. If the axle 14 is fixed, bushing means can be provided in hub 11 to reduce friction, and suitable means (not shown) can also be incorporated to locate and retain the wheel on the axle. Should it be desired to use the wheel 10 as a driving wheel, the wheel can be fixedly mounted on the axle in any suitable manner following conventional practice. It will be obvious that the axle, its retaining or bushing means, or the vehicle upon which the wheel is to be mounted, are not a part of this invention and thus will not be shown or further described in this specification.

Elastic rim 12 and arcuate spokes 13 can be fabricated out of a suitable resilient sheet metal or plastic material having the required strength and fatigue resistant properties. Because of the high structural efficiency of this design, and because it operates at low stress levels with minimum energy losses, considerable freedom in the choice of materials of construction is permitted such that emphasis may be placed on such factors as low cost, light weight, ease of fabrication, and the like. Irrespective of the material selected, I have found for maximum efficiency the integrated spring constant for the total wheel is related to the ratio of $$\frac{r^4 K_s}{E_r I_r C}$$

where $r$ is the radius in inches of the free and undistorted wheel, $K_s$ is the sum of the spring constants of the individual spokes, $E_r$ is the standard modulus of elasticity of the rim, $I_r$ is the moment of inertia of the rim, and $C$ is the circumference of the rim in inches. For the wheel of my invention, the value of this ratio should be at least 1 and should not exceed 10 for wheels constructed from metal, and should be at least 10 and should not exceed 100 for wheels constructed from lower modulus materials such as, for example, fiberglass or other suitable plastics. It is of interest to note that the value of this ratio in a conventional rigid wheel such as a bicycle wheel ranges from 1,000 to 10,000. The aforementioned ranges of the ratio of $$\frac{r^4 K_s}{E_r I_r C}$$

have been found desirable for if the ratio is greater than 10 for metal wheels, or greater than 100 for wheels constructed of materials other than metal, the desired elongation of the footprint under load or torque will not occur. Conversely, if the ratio is less than 1 for metal wheels or less than 10 for wheels constructed of materials other than metal, the wheel will not be capable of offering the proper support under driving forces or load.

The inner end 15 of each spoke 13 is tangential to the periphery of the hub 11 and is fixedly fastened thereto by any suitable method as by welding or riveting. The outer end 16 of each spoke 13 is tangential to the rim 12 and is connected thereto preferably by means that will not unduly restrict the freedom of hinge movement of the spoke relative to the rim. Such fastening means can advantageously comprise a simple hinge means of flexible sheet material 17 bonded or welded to the inside surface of outer end portion 16 of each spoke and to the inside surface 18 of rim 12, or other suitable means such as a hinged pin arrangement can be used.

If reference is made to the drawings, the operation of my device may be readily comprehended. In the static condition, the spokes are subject only to the static load and the hub is in a relatively centralized position such that the outer configuration is substantially circular as perhaps best shown in FIG. 1.

Figure 2:
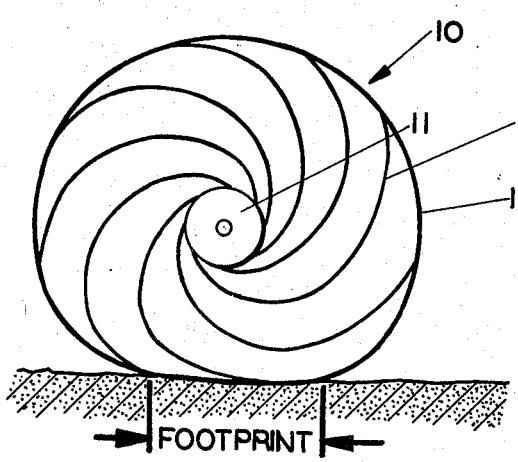
FIG. 2 is a diagrammatic side elevation illustrating my wheel under vertical loading.

Applying a vertical load to the wheel results in a deflection vertically downward of the hub 11 to cause the wheel to assume automatically an elliptical shape as shown in FIG. 2. As a consequence of the wheel assuming an elliptical shape, the footprint or contact area of the rim with the supporting surface is increased. It should be understood, of course, due to the interaction of loads and forces in this design, that this elliptical shape under load is a dynamic condition which persists from a standstill throughout the speed range of the wheel.

Figure 3:
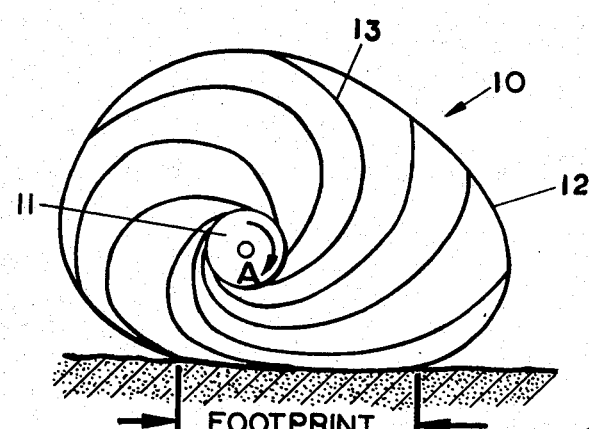
FIG. 3 is a diagrammatic side elevation illustrating my wheel under torque and vertical load.

Applying a driving force or torque to the wheel in the direction of the arrow shown in FIG. 3 results in a tendency for the inner ends of the spokes 13 to "wind up" around the hub 11 which causes the wheel to assume a more pronounced elliptical shape as shown. Thus, the application of torque results in an increase in the wheel footprint with the increase being proportional to the increase in torque. It is clear that this automatic increase in the ground contact area of the wheel with vertical load and/or torque greatly enhances the mobility of the wheel particularly under poor soil conditions. In addition, when the wheel is in a condition of vertical load and torque as shown in FIG. 3, sufficient resiliency is retained by the spoke system such that the shock cushioning ability of the wheel is not unduly impaired.

It will be obvious that it is within the spirit and scope of this invention to provide the outer periphery of the wheel with means such as a coating or surface of suitable plastic or elastomeric material to provide braking friction and to damp out noise when traveling on hard surfaces. The tractive ability of this wheel can be improved also by the provision of vertical grouser plates or cleats substantially as shown for the embodiment of my invention next to be described.

Figure 4:
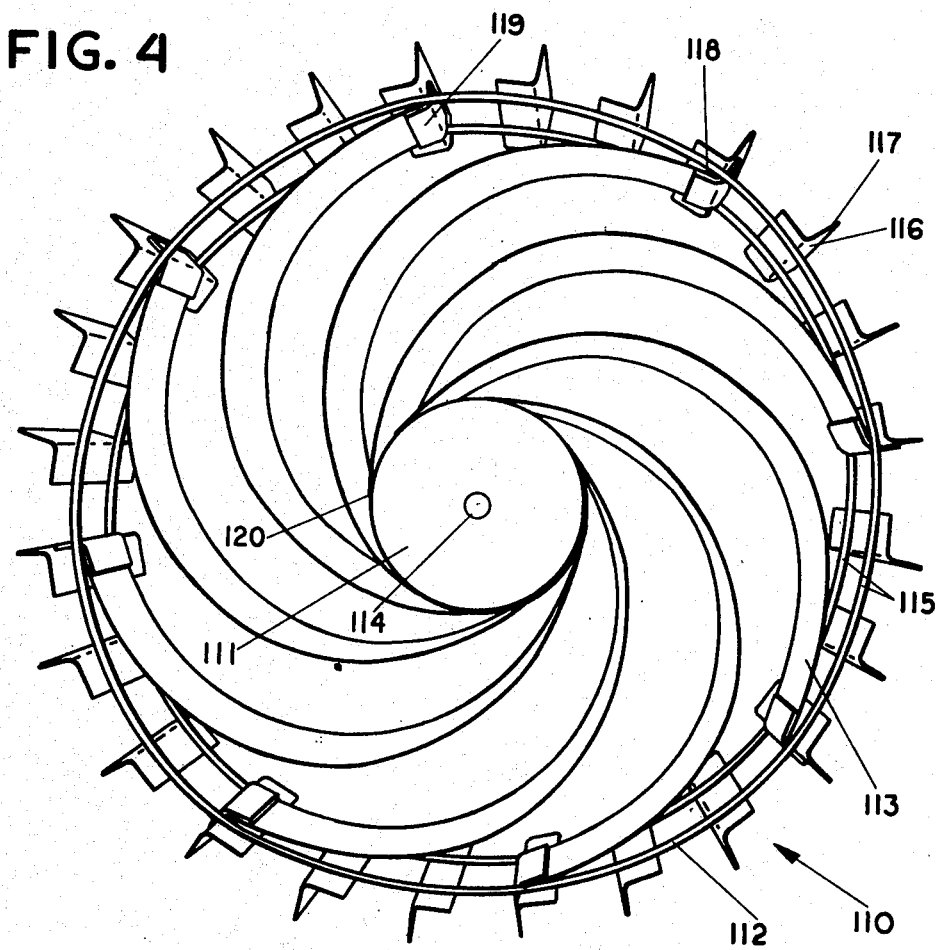
FIG. 4 is a perspective view of another embodiment of the wheel of my invention.

An embodiment of my invention incorporating spaced links or grouser plates is illustrated in FIG. 4. As shown, this resilient wheel 110 comprises a hub 111, elastic rim means 112, and arcuate elastic spokes 113 connecting the rim means to the hub 111 by which the wheel is mounted on the vehicle by means of a suitable axle 114. As in the discussion of the previous embodiment of my invention, the axle, its retaining or bushing means, or the vehicle upon which the wheel is to be mounted, form no part of my invention and thus will not be shown or further described in this specification.

In this embodiment, the elastic rim means 112 consists of at least a pair of axially spaced annular resilient wires or rods 115 each having an identical circumference. Spaced around the periphery o fthe annual wires 115 which form the rim of the wheel are a plurality of links or grouser plates 116 which are of right-angled section and are suitably fixed as by welding to the outer periphery of annular wires 115 such that the upright portion 117 of each link projects radially from the periphery of the wheel.

The outer end 118 of each spoke 113 is tangential to the rim means 112 and is connected thereto preferably by means that will not unduly restrict the freedom of hinge movement of the spoke relative to the rim means. Such fastening means can advantageously comprise a simple hinge means of flexible sheet material 119 bonded or otherwise suitably fastened to the inside surface of outer end portion 118 of each spoke and to the upright portion 117 of appropriately located links 116. However, it is obvious that other suitable means such as a hinged pin arrangement can be used. The inner end 120 of each spoke 113 is tangential to the periphery of hub 111 and is fixedly attached thereto by a suitable method as by welding or riveting.

As has been pointed out in the discussion of the previously described embodiment of the wheel of my invention, considerable freedom is permitted by the design in the materials of construction for the wheel; however, for maximum efficiency of operation, the spring constant of the wheel must fall within those ranges previously specified with respect to the embodiment hereinbefore described.

In operation, this embodiment of my wheel responds to loads and/or torque in an identical manner as described for the previously discussed embodiment. Upon application of a load and/or a torque, the wheel is caused to assume an elliptical shape with a consequent elongation or increase in wheel footprint. This elongation of the wheel footprint, it is obvious, will increase the number of the spaced links 116 in contact with the supporting surface. Although this will, of course, increase the rolling resistance of the wheel, the increase in gross traction with the greater number of links in contact with the surface results in a significant increase in net traction. I have found the increase in traction to be proportional to the number of links in contact with the surface.

Although shown and described in what is believed to be the most practical and preferred embodiments, it is apparent that departures from the specific constructions shown will suggest themselves to those skilled in the art and may be made without departing from the spirit and scope of the invention. I therefore do not wish to restrict myself to the particular constructions illustrated and described, but desire to avail myself of all modifications that may fall within the scope of the appended claims.

Having thus described my invention, what I claim is:

1. A resilient wheel comprising a hub, elastic rim means, and a plurality of arcuate elastic spokes connecting said rim means to said hub, said wheel having a spring constant of not less than 1 and not more than 100, said spring constant being defined as $$\frac{r^4 K_s}{E_r I_r C}$$

wherein $r$ is the radius of the free and undistorted wheel, $K_s$ is the sum of the spring constants of the individual spokes, $E_r$ is the modulus of elasticity of the rim, $I_r$ is the moment of inertia of the rim, and C is the circumference of the rim.

2. A resilient wheel comprising a hub, metallic elastic rim means, and a plurality of arcuate metal elastic spokes connecting said rim means to said hub, said wheel having a spring constant of not less than 1 and not more than 10, said spring constant being defined as $$\frac{r^4 K_s}{E_r I_r C}$$

wherein $r$ is the radius of the free and undistorted wheel, $K_s$ is the sum of the spring constants of the individual spokes, $E_r$ is the modulus of elasticity of the rim, $I_r$ is the moment of inertia of the rim, and C is the circumference of the rim.

3. A resilient wheel as defined in claim 2 wherein said rim means consists of resilient sheet metal.

4. A resilient wheel as defined in claim 2 wherein said rim means consists of at least two axially spaced annular resilient wires.

5. A resilient wheel comprising a hub, elastic rim means consisting of plastic material, and a plurality of arcuate elastic spokes consisting of plastic material connecting said rim means to said hub, said wheel having a spring constant of not less than 10 and not more than 100, said spring constant being defined as $$\frac{r^4 K_s}{E_r I_r C}$$

wherein $r$ is the radius of the free and undistorted wheel, $K_s$ is the sum of the spring constants of the individual spokes, $E_r$ is the modulus of elasticity of the rim, $I_r$ is the moment of inertia of the rim, and C is the circumference of the rim.

6. A resilient wheel comprising a hub, a plurality of arcuate elastic spokes attached to said hub, rim means comprising at least two axially spaced resilient rods, a plurality of links of right-angled section connected to and spaced around the periphery of said rods, and means attaching the outer ends of each of said spokes to certain of said links, said wheel having a spring constant of not less than 1 and not more than 100, said spring constant being defined as $$\frac{r^4 K_s}{E_r I_r C}$$

wherein $r$ is the radius of the free and undistorted wheel, $K_s$ is the sum of the spring constants of the individual spokes, $E_r$ is the modulus of elasticity of the rim means, $I_r$ is the moment of inertia of the rim means, and C is the circumference of the rim means.

7. A resilient wheel comprising a hub, rim means comprising at least two axially spaced resilient annular rods, a plurality of grouser plates connected to and spaced around the periphery of said rods, a plurality of arcuate elastic spokes having their inner ends tangential to the periphery of said hub and fixedly fastened thereto and having their outer ends tangential to said rim means, and hinge means attaching the outer ends of said spokes to certain of said grouser plates, said wheel having a spring constant of not less than 1 and not more than 100, said spring constant being defined as $$\frac{r^4 K_s}{E_r I_r C}$$

wherein $r$ is the radius of the free and undistorted wheel, $K_s$ is the sum of the spring constants of the individual spokes, $E_r$ is the modulus of elasticity of the rim means, $I_r$ is the moment of inertia of the rim means, and C is the circumference of the rim means.

References Cited by the Examiner

UNITED STATES PATENTS

| 52,422 | 2/66 | Lane | 152—12 |
|---|---|---|---|
| 1,260,655 | 3/18 | Fahrney | 301—43 X |
| 1,484,228 | 2/24 | Matteson | 301—52 |
| 2,321,954 | 6/43 | Thorsness | 152—12 |
| 2,869,608 | 1/59 | Chamberlain et al. | 152—86 |

FOREIGN PATENTS

| 6,425 | 1912 | Great Britain. |
|---|---|---|
| 254,693 | 12/48 | Switzerland. |

OTHER REFERENCES

Delrin Acetal Resin Manual, June 1957, pages 7 and 8 relied upon.

ARTHUR L. LA POINT, *Primary Examiner.*